United States Patent [19]
Ravas et al.

[11] 3,796,989
[45] Mar. 12, 1974

[54] DIRECTION SENSITIVE DOPPLER PROCESSOR

[75] Inventors: Richard J. Ravas, Monroeville; Theodore M. Heinrich, Murrysville; Paul M. Johnston, Greensburg, all of Pa.; John R. Reeves, Orange, Conn.

[73] Assignee: Westinghouse Electric Corp., Pittsburgh, Pa.

[22] Filed: June 1, 1972

[21] Appl. No.: 258,592

[52] U.S. Cl............. 340/1 R, 340/3 D, 340/258 A, 343/7.7
[51] Int. Cl........................ G01s 9/66, G08b 13/16
[58] Field of Search ......... 343/7.7, 8; 340/1 R, 3 D, 340/258 A

[56] References Cited
UNITED STATES PATENTS
3,663,932  5/1972  Mount et al. ..................... 340/3 D
3,432,855  3/1969  Kalmus .............................. 343/7.7

Primary Examiner—Richard A. Farley
Attorney, Agent, or Firm—M. P. Lynch

[57] ABSTRACT

The invention relates to an improvement in direction sensitive ultrasonic Doppler detecting devices wherein an ultrasonic transducer transmits a given frequency signal toward an object which in turn reflects the given signal and Doppler shifted signals based on the movement of the object. The reflected signals including the Doppler shifted signals are processed and evaluated to determine the characteristics of the object movement both as to direction and degree. The insertion of a differentiating circuit in the processing of the reflected signals minimizes false interpretation of the reflected signals caused by non-harmonic oscillatory movement of the object. Furthermore through the addition of a signal processing circuit utilizing a nonlinear multiplier circuit for multiplying the instantaneous values of the components of the reflected signals in contrast to the linear multiplication of these signals, the loss of sensitivity of the Dopper detection device as a function of distance is represented as 1/(distance to object) instead of 1/(distance to object)$^2$ as in the case in the conventional coherent Doppler detection devices.

4 Claims, 7 Drawing Figures

3,796,989

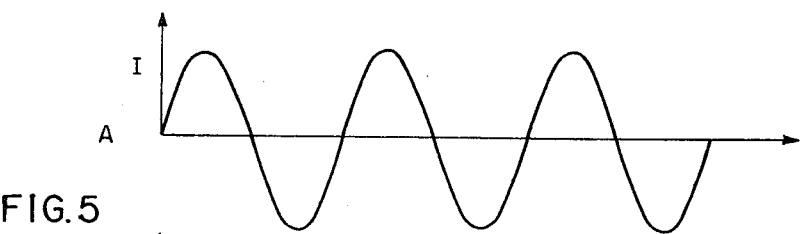
FIG. 5
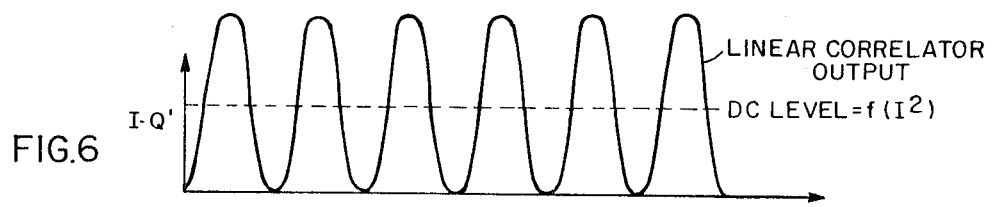
FIG. 6
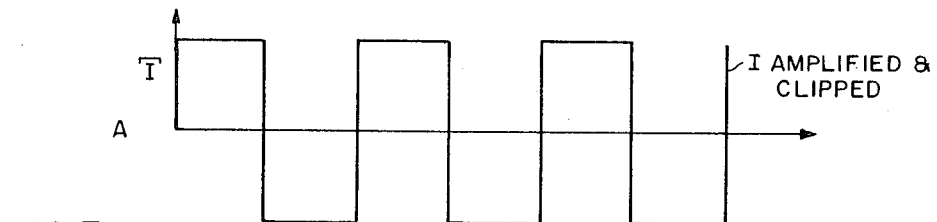
FIG. 7
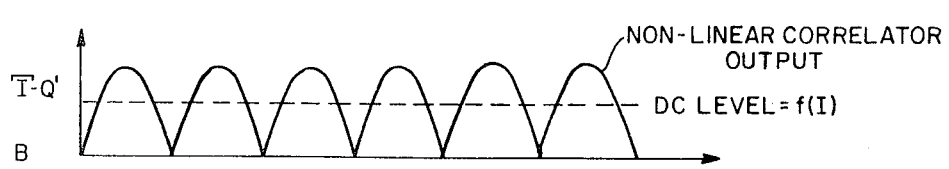

DIRECTION SENSITIVE DOPPLER PROCESSOR

CROSS-REFERENCE TO RELATED APPLICATION

This application is related to cofiled, copending application Ser. No. 258,716, filed June 1, 1972, which is assigned to the assignee of the present invention.

BACKGROUND OF THE INVENTION

Ultrasonic Doppler intrusion detectors have been investigated for many years in hope of achieving a practical volume sensitive intrusion alarm. All such systems to date are hindered by the tendency toward false alarms caused by air turbulence, thermal currents, oscillatory movement of a target object, etc. While an obvious remedy would be the addition of signal amplification to achieve increased sensitivity, the increased sensitivity results in a corresponding increase in tendency towards false alarms. Hence all Doppler detection devices to date required a compromise between sensitivity and reliability.

Numerous techniques have been employed to improve the sensitivity versus reliability trade off in the Doppler detection device. One such technique is disclosed in U.S. Pat. No. 3,432,855 issued to Henry P. Kalmus, Mar. 11, 1969 and assigned to The United States of America. While this patent discloses modifications in the correlation technique of the signals reflected from a moving object in an effort to improve the sensitivity versus reliability factor, the disclosed system suffers from the need for a wide bandwidth 90° phase shifter having approximately constant amplitude response over its full range of operating frequencies. This need can be satisfied by using wide band 90° phase shifters such as the Dome network used extensively in a single side band communication network. The complexity and critical adjustments required in implementing this phase shifter function renders it impractical for use in mass produced systems.

The present availability of linear multiplier integrator circuits makes the multiplier correlator an attractive device for use in correlating the components of the reflected signals from a moving object. Unfortunately the multipliers require a significant array of associated components to facilitate dc offset correction. The requirement for the additional associated components and the further requirement for sensitive adjustment makes the multipliers currently utilized an expensive technique. Another serious drawback resulting from the use of a linear multiplier correlator is the rapid loss of sensitivity of the Doppler detector as a function of distance from the moving object. This results from the fact that the system uses the Doppler phenomenon to generate a signal as a function of the relative velocity between the device transmitting the ultrasonic signal to the object and the object itself. This signal is identified in the present disclosure as phase signal I. A second signal which is also a function of this relative velocity but has its phase shifted a fixed amount, is simultaneously generated. This phase shifted signal is identified in the following disclosure as quadrature signal Q. In the above identified patent the signals I and Q are applied to a linear multiplier correlator and a resulting product of the signals results in a correlator output signal which is proportional to the square of the input signal I or Q. The Doppler detector's sensitivity is thus inversely proportional to the square of the distance.

SUMMARY OF THE INVENTION

The description of the exemplary embodiment of the invention which follows recites the use of a differentiator circuit for differentiating either of the I or Q signals prior to application to the signal correlator as a technique for reducing the occurrence of false alarms, and further discloses the use of an improved correlator multiplier circuit for reducing the loss of detector sensitivity as a function of distance from a factor of $1/(distance)^2$ to $1/(distance)$.

The improved correlation technique disclosed in the following exemplary embodiment utilizes a non-linear multiplier to multiply the instantaneous values of the signals I and Q in contrast to the simple linear multiplication of the signals I and Q as described in the above prior art reference. The multiplication of the instantaneous values of the signals I and Q can be implemented by amplifying one of the signals, as for example I, and subsequently clipping it in order to produce an ac rectangular type waveform of a given amplitude.

The invention will become more readily apparent from the following exemplary description in connection with the accompanying drawings.

DESCRIPTION OF THE DRAWINGS

FIGS. 5, 6 and 7 are waveform illustrations of the Doppler detector system of FIGS. 1–3.

DESCRIPTION OF THE PREFERRED EMBODIMENTS

Figure 1:
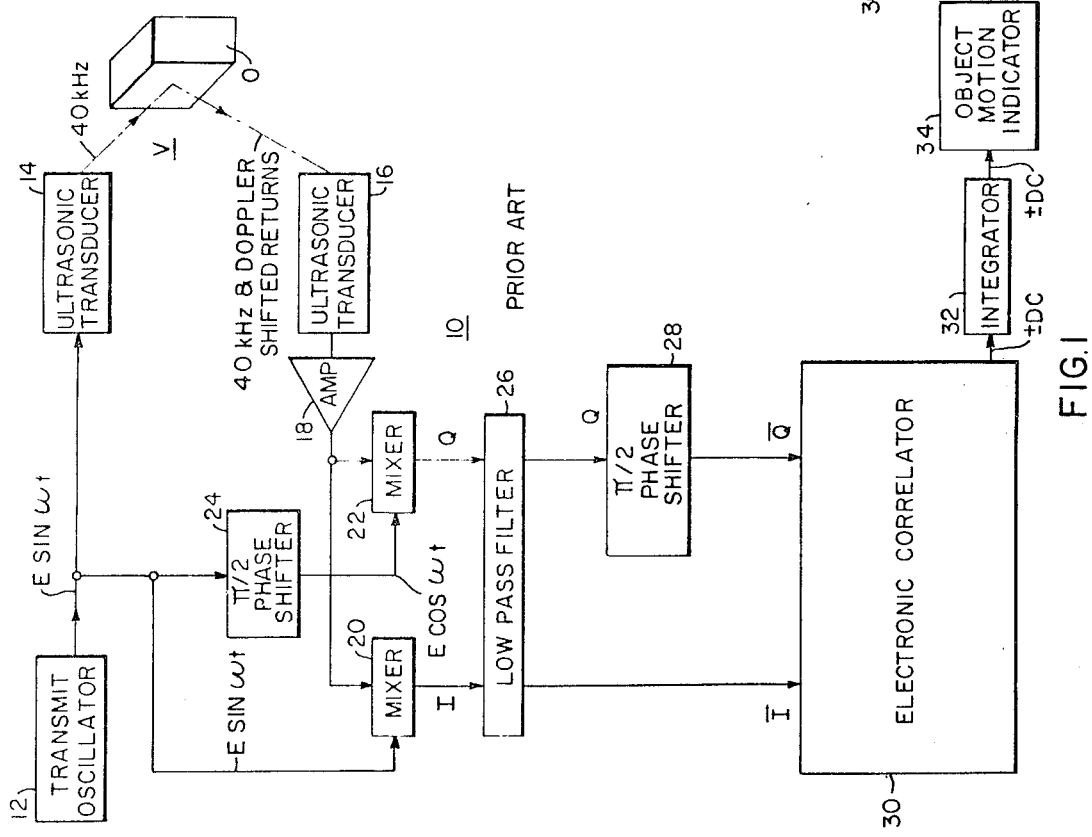
FIG. 1 is a block diagram schematic of prior art ultrasonic Doppler detector system.

Referring to FIG. 1 there is illustrated in block diagram form a prior art direction sensitive Doppler detection system 10 as disclosed in the above identified U.S. patent. The system employs CW ultrasonic oscillator 12 which energizes an ultrasonic transducer 14 with a signal $E \sin-\omega t$ to which the ultrasonic transducer responds by filling a volume V with ultrasonic waves of a frequency typically chosen to be 40 KHz. When an object O, such as a door or draperies, within the volume V moves, a receiver transducer 16 responds to the ultrasonic waves reflected by said moving object which waves include a Doppler shifted return in addition to the predominant 40 KHz signal the later of which is in-phase with the transmitted ultrasonic waves of ultrasonic transducer 14. The composite signal received by receiver transducer 16 is amplified by amplifier circuit 18 and applied as input signals to mixer circuits 20 and 22. The output voltage of oscillator circuit 12 is supplied directly as a second input to mixer circuit 20 while phase shifter circuit 24 applies a $\pi/2$ representation of the output of oscillator circuit 12 as a second input to the mixer circuit 22. Thus mixer circuit 20 functions to multipy the composite reflected signal from the moving object O with the output excitation signal of oscillator circuit 12 while the mixer circuit 22 functions to multiply the composite reflective signal from moving object O with a signal corresponding to a 90° phase shift of the output excitation signal of the oscillator circuit 12. The output of each multiplier circuit contains two frequency components corresponding to the sum and difference of the frequencies of the signals being multiplied. Of these signals, only the difference signal or lower sideband is desired. The multiplication operation of the mixer circuits 20 and 22 results in the generation of output signal I from multiplier circuit 20 and an output signal Q from mixer circuit 22 which is out of phase with the signal I, either leading or lagging depending on the direction of motion of the object O. The relative phase relation of the output signals I and Q can be achieved in a manner other than described above. In other words either of the input signals to either of the mixer circuits 20 and 22 can be processed through a phase shifter circuit 24 to achieve a desirable phase relationship between the output signals I and Q of the mixer circuits 20 and 22. The output signals I and Q are subsequently transmitted through low pass filter circuit 26 to remove upper sideband components from these waveforms as well as remove any residual mixer excitation voltage (E sin ω t). The use of an electronic sign correlator, be it a linear multiplier which multiplies signals I and Q or an addition/subtraction network which mathematically compares signals I and Q, requires that the electronic correlator 30 be presented with input signals I and Q which are either in phase or 180° out of phase with respect to one another. Inasmuch as the signals I and Q transmitted by low pass filter 26 do not satisfy this relationship, a wide band phase shifter circuit 28 is inserted in advance of the electronic correlator 30 to produce signals $\bar{I}$ and $\bar{Q}$ which are of constant amplitude and proper phase relationship to satisfy the requirements of the electronic sign correlator 30. The operation of the phase shifter circuit 28 is described in detail in the Kalmus patent. The input requirements of the signals I and Q for correlator 30 can be achieved by inserting the π/2 phase shifter in either the I or Q line output from the low pass filter circuit 26. It is noted that this phase shift is independent of direction of motion of the object O and thus the resultant signals will either be inphase or 180° out-of-phase depending on the direction of motion. It should be further noted that the phase shifter circuit 28 in the prior art ideally should produce constant amplitude and constant phase shift over a relatively wide frequency range, typically two decades. These operational requirements necessitate significant expense to implement. The above referenced U.S. Patent implements the overall performance of the disclosed system by employing two RC pairs which produce a 90° phase shift at all frequencies but at an undesirable amplitude response.

The term sign correlator refers to the operation whereby the instantaneous value of one sinusoid is multiplied by the sign, polarity, of the other sinusoid. The sign correlator functions in a manner similar to a synchronous detector.

In the event the electronic correlator is implemented through the use of a linear multiplier the dc output signal from the electronic sign correlator 30 corresponding to the product resulting from the multiplication of the input signals $\bar{I}$ and $\bar{Q}$ is of one polarity if the object movement is in one direction and an opposite polarity if the object movement is in the opposite direction. This dc output signal from the electronic correlator 30 is then applied to integrator 32. One function of the integrator circuit 32 is to cancel the effects of oscillatory movement of the object which result in zero net movement of the object while producing a dc output signal of a polarity and magnitude corresponding to a net movement of the object O in either a forward or reverse direction. The output signal from the integrator circuit 32 is subsequently applied to an object motion indicator circuit 34 which is actuated in response to an unacceptable level of net movement of the object O. Circuit 34 can be represented as an alarm circuit for intrusion applications.

Figure 2:
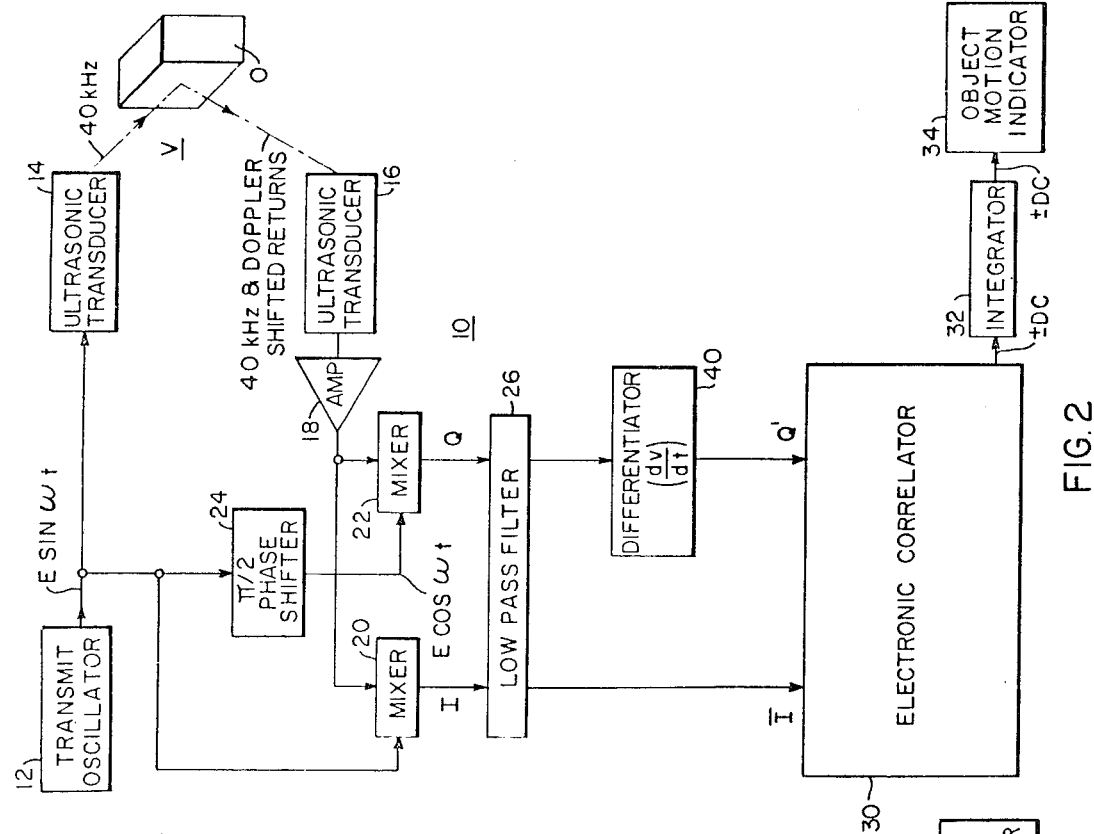
FIG. 2 is a block diagram schematic of the Doppler system illustrated in FIG. 1 with the addition of a differentiator circuit.

Referring to FIG. 2 there is shown in block diagram form the basic Doppler detection system of FIG. 1 with modifications comprising removal of the phase shifter circuit 28 of FIG. 1 and the substitution of the differentiator circuit 40. The differentiator circuit 40 provides the required 90° phase shift described with reference to the prior art embodiment for all frequencies at relative low cost. The substitution of the differentiator circuit 40 for the phase shift constant amplitude circuit 28 of FIG. 1 violates the prior art requirement as disclosed in the identified U.S. Patent for a constant amplitude signal and in fact produces a frequency dependent increase in the amplitude of the signals developed. The increase in amplitude has been typically determined to be at a rate of 6 db per octave. It has been determined through experimentation and analysis that this rise in amplitude is in fact preferable to the constant amplitude characteristic disclosed by the prior art. To illustrate the desirable characteristics of the differentiator circuit 40 consider the moving object to be a drapery suspended in front of an open window such that the drapery is caused to move relatively rapidly away from the window in response to a breeze while moving back toward the window at a relatively slow rate in the absence of a breeze. The amplitude of the Doppler signal reflected by the moving drapery is a function of the size of the drapery and its distance from the receiving transducer 16 and is independent of the velocity of the drapery movement. Thus when the drapery moves forward the output from the integrator 32 of the prior art embodiment of FIG. 1 can be represented as:

$$V_{(Integrator)} = K \int_{t_0}^{t_1} (Area) dt \quad (1)$$

As the drapery returns to its original position the output of the integrator 32 is represented as:

$$V_{(Integrator)} = K \int_{t_0}^{t_1} (Area) dt - \int_{t_0}^{t_2} (Area) dt \quad (2)$$

Since $(t_1 - t_0)$ $(t_2 - t_1)$ there is a net voltage integral for each forward-reverse movement of the drapery and thus an alarm indication will be generated.

In the embodiment of FIG. 2 however where the differentiator circuit 40 is inserted, thus providing voltage amplitudes proportional to velocity $(dx/dt)$, the output of the integrator circuit 32 is represented as:

$$V_{(Integrator)} = K \int_{t_2}^{t_1} (Area) \left(\frac{dx}{dt}\right) dt + K \int_{t_1}^{t_2} (Area) \left(\frac{dx}{dt}\right) dt$$

$$= K_1 \int_{X_0}^{X_1} (Area) dx + K_1 \int_{X_1}^{X_2} (Area) dx = 0 \quad (3)$$

The net zero output of the integrator circuit 32 in response to forward-reverse movement of the drapery resulting from the use of the differentiator circuit 40 essentially eliminates false alarms triggered by the embodiment of FIG. 1 in response to oscillatory movement of the object O.

Advantages other than the avoidance of false alarms are provided by the use differentiator circuit 40. Noise density curves associated with conventional Doppler processing schemes can be generally characterized in the form: Noise Density (volts/hertz) $\propto 1/f$. This relationship indicates that the noise increases very rapidly at the low end of the Doppler shift range. As a result, some Doppler processors have to use adaptive filter networks which raise the low frequency cutoff of the system under high turbulent conditions to avoid overpowering noise levels. It is noted that the differentiator circuit 40, because of its transfer characteristics $A = Kf$ which states that gain or amplitude $A$ is a function of frequency $f$, automatically levels the noise spectrums so that the very low frequency noise components are always strongly attenuated.

The advantages therefore available with the use of a differentiator circuit 40 in the Doppler processing scheme as illustrated in FIG. 2 include providing near perfect 90° phase shift over all frequencies, providing discrimination against non-harmonic oscillatory motions of an object, and inherently discriminating against $1/f$ Doppler noise resulting from air turbulence, etc.

Figure 3:
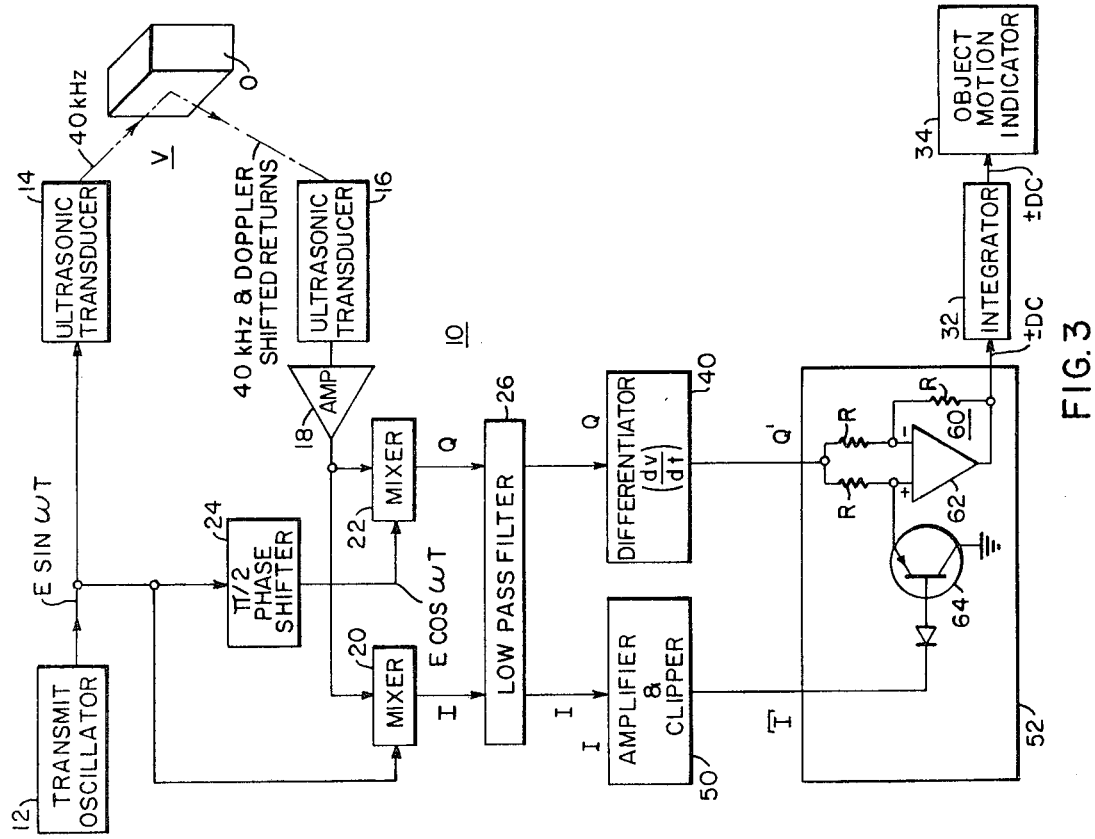
FIG. 3 is a block diagram schematic of a Doppler system as illustrated in FIG. 2 with the addition of an improved correlator circuit.

In addition to providing false alarm immunity through the use of a differentiator circuit 40 in the scheme depicted in FIG. 2 further improvements in the prior art Doppler detection system of FIG. 1 can be provided through modification of the correlator circuit 30 in a manner illustrated in the block diagram schematic of FIG. 3. With the exception of the high gain amplifier and clipper circuit 50 and the non-linear sign correlator circuit 52 the Doppler processing scheme 60 of FIG. 3 corresponds substantially to the Doppler processing system disclosed in FIG. 2. As was noted earlier the electronic correlators presently in use generally employ linear multiplier integrator circuits to determine the correlation between the I and Q signals. The two part improvement illustrated in FIG. 3 in the form of the amplifer and clipper circuit 50 and the non-linear multiplier and sign correlator circuit 52 establishes the Doppler processing scheme depicted in FIG. 3 as being far superior to the embodiments of FIG. 1 wherein a linear multiplier circuit is utilized. The implementation of the correlator operation in FIG. 3 eliminates the need for dc offset circuitry by employing the most common and least expensive integrator circuits.

The amplifier and clipper circuit 50 functions to increase the gain of the I signal transmitted by the low pass filter 26 and to clip the resultant signal producing a rectangular wave train $\overline{T}$ which is subsequently supplied to one input of the correlator circuit 52 while the Q' signal produced by the differentiator circuit 40 is supplied as a second input to the correlator circuit 52. It is important that the amplifier and clipper circuit 50 be positioned in the I signal leg of the system so as to retain the amplitude information present in the Q' signal. The processing of the I and Q signals through differentiator circuit 40 and the amplifier and clipper circuit 50 provides a significant improvement in the Doppler detection system sensitivity and range effectiveness. The I signal is a complex waveform, comprised of a sum of sine waves, which continually varies in average amplitude. The necessary information contained in the I signal is the zero voltage crossing points of the signal and the indication as to whether the signal is positive or negative between the zero crossing points. By passing the input signal I through the high gain amplifier and clipper circuit 50, there is developed an output voltage which has the form of a psuedo squarewave resulting from the amplifier being driven to its positive and negative clipping or saturation limits. The amplitude of the resultant output waveform of the amplifier and clipper circuit 50 is thus constant.

A typical implementation of sign correlator circuit 52 is illustrated in the Doppler detector system of FIG. 3.

The implementation of the nonlinear sign correlator circuit 52 in the system of FIG. 3 includes a gated phase inversion network 60 comprised of an operational amplifier network including amplifier 62 and resistors R to achieve selective phase reversals and to perform the operation of correlation of the I and Q signals which heretofore has been accomplished through the use of a linear multiplier circuit. The gated phase inversion network 60 includes a transistor 64 employed in a chopper mode with a high base-emitter breakdown voltage to permit signal input excursions of approximately + and —12 volts. The operational amplifier network 62 operates at unity and presents either an inverted or non-inverted output dependent on the drive applied to the transistor 64. The clipped $\overline{T}$ signals drive the transistor while the Q' signals are applied as inputs to the operational amplifier 62. Cost reduction can be achieved through utilization of a germanium transistor, type 2N404, or through the use of a silicon device with Zener limited input signals or even through the use of similar circuitry employing MOSFET switching devices. In a typical embodiment the resistors R are of equal value. With the chopper transistor 64, which functions as a switch, in the open condition, the transfer characteristics of the gated phase inverter circuit 60 can be represented as $$V_o = V_i \quad (5)$$

while with the chopper transistor 62 in a closed condition the transfer characteristics can be represented as $$V_o = -V_i \quad (6)$$

The state of the chopper transistor 64 is controlled by the sign of the clipped $\overline{T}$ signal. This implementation of the non-linear sign correlator circuit 52 results in an output signal whose amplitude is linearly related to Q' since the amplifier and clipper circuit 50 has removed all amplitude fluxuations from the signal I. In conventional linear multiplier correlators, the output signal is a product of I.Q' and since the amplitude of I is related to Q', the output signal is related to $(Q')^2$. Obviously, as the signal levels of I and Q' decrease, the $(Q')^2$ characteristic fades more rapidly than the Q' characteristic.

Investigations were made to determine if the nonlinearity of the sign correlator 52 would produce undesirable false alarm sensitivity. It is shown mathematically below that the nonlinear sign correlator circuit will not introduce any coherent motion indication in the output signal if none existed prior to correlation.

To evaluate the effect of the nonlinear operation of the sign correlator 52 under conditions of complex clutter or movement of an object, consider the following signals:

$$I = \sum_d E_d \cos(\omega_d t + \theta_d). \tag{7}$$

$$= \sum_d E_d \cos\left(K \frac{d(x)_d}{dt} t + \theta_d\right) \tag{8}$$

$$Q = \sum_d E_d \sin(\omega_d t + \phi_d). \tag{9}$$

$$= \sum_d E_d \sin\left(K \frac{d(x)_d}{dt} t + \phi_d\right) \tag{10}$$

$$Q' = \frac{dQ}{dt} = \sum_d K \frac{d(x)_d}{dt} E_d \cos\left(K \frac{d(x)_d}{dt} t + \phi_d\right) \tag{11}$$

where $E_d$ = magnitude of Doppler component
$\omega_d$ = angular frequency of Doppler component
$\phi_d, \theta_d$ = phase angles of Doppler components
$[d(x)_d/dt]$ = spatial velocity of moving target. In the case of the ideal linear multiplier correlator followed by an ideal integrator one achieves the following output:

$$V = \lim_{T \to \infty} \frac{1}{T} \int_0^T I \cdot Q' dt$$

$$= \lim_{T \to \infty} \frac{1}{T} \int_0^T \sum_d E_d \cos t \left(K \frac{d(x)_d}{dt} t + \theta_d\right) \cdot \tag{12}$$

$$= \sum_d E_d \frac{d(x)_d}{dt} E_d \cos\left(K \frac{d(x)_d}{dt} t + \phi_d\right) dt \tag{13}$$

$$= \lim_{T \to \infty} \frac{1}{T} \int_0^T \sum_d E_d^2 \frac{d(x)_d}{dt} \cos^2\left(K \frac{d(x)_d}{dt} t\right)$$
$$\cos(\theta_d - \phi_d) dt \tag{14}$$

$$= \lim_{T \to \infty} \frac{1}{T} \int_0^T \sum_d E_d^2 \frac{d(x)_d}{dt} \frac{1}{2} \left(1 + \cos 2K \frac{d(x)_d}{dt} t\right)$$
$$-\cos(\theta_d - \phi_d) dt \tag{15}$$

A practical system will satisfy the assumption that $$\cos\left(2K \frac{d(x)_d}{dt} t\right) \neq \frac{d(x)_d}{dt} \tag{16}$$

for any sustained period and thus this term will not cause any dc component within the integral. It will, therefore, produce no net value over the period of integration and may be ignored in order to simplify the equation.

The resulting simplified equation is thus $$V = \lim_{T \to \infty} \frac{1}{T} \int_0^T \sum_d \frac{M_d}{2} E_d^2 \frac{d(x)_d}{dt} dt$$
where $M_d = \cos(\theta_d - \phi_d)$ (17)

$$= \sum_d \frac{M_d}{2} E_d^2 \lim_{T \to \infty} \frac{1}{T} \int_0^T \frac{d(x)_d}{dt} dt \tag{18}$$

$$= \sum_d \frac{M_d}{2} E_d^2 \lim_{T \to \infty} \frac{1}{T} (x_T - x_0) \tag{19}$$

when $x_T$ = final position of moving target
$x_o$ = initial position of moving target.

We thus see that if $x_T - x_o$ is not a constantly increasing function of time, then $V = 0$ and no alarm occurs. Notice that there is no stipulation about the target motion being a simple sinusoid, thus any fluttering motion would be ignored.

Now consider the situation of the sign correlator which effectively employs a limiter in the I branch prior to multiplication. This produces a limited I signal which is a psuedo-square wave of amplitude ± described by the relation:

$$\bar{I} = I/|I| \tag{20}$$

It is possible to employ a cross correlation function to determine the Fourier components of I but for our purposes, let us perform a similar exercise to determine the presence of components of the form:

$$\bar{I} = \sum_d \bar{E}_d \cos\left(K \frac{d(x)_d}{dt} t + \alpha_d\right)$$
$$+ \text{harmonics} + \text{cross product} \tag{21}$$

where $\alpha_d$ is the phase angle between the transmitted wave and the received wave.

We know that such components will exist in spite of the limiting since they were present before limiting and some residual components must be left after limiting. Since only terms corresponding to the original components in the waveform prior to limiting can have any correlation with components in Q', the harmonics and cross products can be ignored and the residuals of the original waveform evaluated. This is accomplished by employing the cross correlation function:

$$\bar{E}_d = \lim_{T \to \infty} \frac{1}{T} \int_0^T \cos\left(K \frac{d(x)_d}{dt} t + \alpha_d\right) \cdot I dt. \tag{22}$$

This correlation procedure will determine the total value of $E_d$ comprised of remnants of the original sinusoidal signal plus contributing effects of harmonics and cross products of all other signals undergoing the nonlinear limiting process.

Now perform the multiplication and integration:

$$V = \lim_{T \to \infty} \frac{1}{T} \int_0^T \bar{I} \cdot Q' dt \tag{23}$$

$$\lim_{T \to \infty} \frac{1}{T} \int_0^T \sum_d \bar{E}_d \cos\left(K \frac{d(x)_d}{dt} + \alpha_d\right)$$
$$\cdot \sum_d E_d K \frac{d(x)_d}{dt} \cos\left(K \frac{d(x)_d}{dt} t + \phi_d\right) \tag{24}$$

Notice that this returns us to the relationship defined in Equation (11) and in all ways duplicates the performance of the linear multiplier correlator which produces no net dc output so long as there is no net cyclic motion by any of the object surfaces within the area of surveillance.

It can be concluded then that the use of limiting in the I branch of the signal processor does not in any way impair the system's ability to discriminate against clutter. The presence of clutter signals which are very strong relative to an actual intrusion will have a tendency to reduce the system's sensitivity to the intrusion signal by an effect analogous to the capture phenomenon in FM reception It is unlikely to cause complete signal suppression, however, and thus objects or individual will still be detected but the detector will require increased distance of intruder travel to do so. The overall effect is that in the event of an extremely high clutter environment, the performance will automatically tend to revert back to the sensitivity characteristic of the linear correlator.

Figure 4:
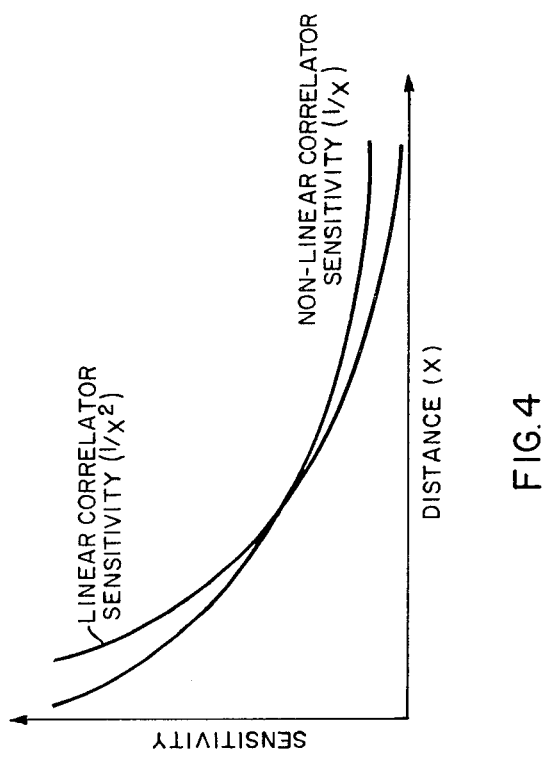
FIG. 4 is a graphical illustration depicting plots of sensitivity versus distance for the prior art detector system of FIG. 1 and the improved Doppler detector system of FIG. 3.

Referring to FIG. 4 there is illustrated in curve A a plot of sensitivity versus distance for the conventional Doppler processing device using the linear multiplier while in curve B there is illustrated a plot of sensitivity versus distance exhibited by the improved correlator circuit illustrated in FIG. 3. It is noted that the plot of sensitivity versus distance of curve A is represented by the expression $1/X^2$ where $X$ represents the distance while the plot for the Doppler detection scheme utilizing the improved correlator circuit as illustrated in curve B is represented by the term $1/X$ thus indicating the significant improvement in sensitivity of the Doppler processor scheme utilizing the improved correlator circuit of FIG. 3.

The operation of the prior art electronic correlator relative to the improved sign correlator of FIG. 3 is illustrated in the waveforms of FIGS. 5, 6 and 7. Waveforms A and B of FIG. 5 illustrate typical I and Q' signals developed in a Doppler detection system. The waveform of FIG. 6 illustrates the output waveform from the prior art electronic correlator acting on the signals of FIG. 5. Waveform A of FIG. 7 illustrates the output of the amplifier and clipper circuit 50 of the embodiment of FIG. 3 while waveform B illustrates the output waveform from the nonlinear electronic sign correlator 52 of FIG. 3 in response to the output of the amplifier and clipper circuit 50 illustrated in waveform A of FIG. 7.

We claim:

1. In a Doppler-type system for detecting movement of an object, the combination comprising, transmitting means for transmitting a signal at a certain frequency, receiving means for receiving the reflected portion of said signal from the object, first mixing means for deriving a Doppler signal which is the difference in frequency between the transmitted and received signal, first phase shifting means for phase shifting the transmitted signal a predetermined amount, second mixing means for deriving a Doppler signal which is the difference in frequency between the phase shifted transmitted signal and the received signal, differentiating means operatively connected to said second mixing means for differentiating the output signal from said second mixing means to provide an output signal which is phase shifted a second predetermined amount and exhibits an amplitude which is a function of the velocity of the moving object, correlating means for evaluating the signals produced by said first mixing means and said differentiating means to produce an object detection signal indicative of the movement of the object, and measuring means operatively connected to said correlating means, said measuring means including an integrating means, the operation of said differentiating means resulting in an output signal from said integrating means indicative of zero net object movement in response to object movement from a reference position and returning to the reference position regardless of velocity to and from the reference position.

2. In a Doppler-type system as claimed in claim 1 wherein said output signal from said differentiating means is in-phase with the output from said first mixing means.

3. In a Doppler-type system as claimed in claim 1 wherein said output signal from said differentiating means is 180° out-of-phase with the output from said first mixing means.

4. In a Doppler-type system as claimed in claim 1 wherein said correlating means produces an output signal of a first polarity in response to movement of an object in one direction and an output of opposite polarity in response to movement of the object in an opposite direction.

* * * * *